(12) United States Patent
Murphy

(10) Patent No.: US 10,323,842 B2
(45) Date of Patent: Jun. 18, 2019

(54) WATERTUBE PANEL PORTION AND A METHOD OF MANUFACTURING A WATERTUBE PANEL PORTION IN A FLUIDIZED BED REACTOR

(71) Applicant: Sumitomo SHI FW Energia Oy, Espoo (FI)

(72) Inventor: John Murphy, Shanghai (CN)

(73) Assignee: Sumitomo SHI FW Energia Oy, Espoo (FI)

( * ) Notice: Subject to any disclaimer, the term of this patent is extended or adjusted under 35 U.S.C. 154(b) by 78 days.

(21) Appl. No.: 15/448,852

(22) Filed: Mar. 3, 2017

(65) Prior Publication Data
US 2018/0252405 A1 Sep. 6, 2018

(51) Int. Cl.
| | | |
|---|---|---|
| F22B 31/00 | (2006.01) | |
| B23P 15/26 | (2006.01) | |
| F22B 37/10 | (2006.01) | |
| F23C 10/02 | (2006.01) | |

(52) U.S. Cl.
CPC .......... *F22B 31/0038* (2013.01); *B23P 15/26* (2013.01); *F22B 31/003* (2013.01); *F22B 31/0084* (2013.01); *F22B 37/102* (2013.01); *F22B 37/107* (2013.01); *F22B 37/108* (2013.01); *F23C 10/02* (2013.01)

(58) Field of Classification Search
CPC .......................... F22B 31/0038; F22B 31/0084
See application file for complete search history.

(56) References Cited

U.S. PATENT DOCUMENTS

| | | | | |
|---|---|---|---|---|
| 4,075,376 A | * | 2/1978 | Jaeger ................. | B23K 35/327 138/145 |
| 4,658,761 A | * | 4/1987 | Duggan .................. | C23C 2/26 122/235.14 |
| 5,091,156 A | | 2/1992 | Ijas et al. | |
| 5,107,798 A | * | 4/1992 | Gerep .................. | F22B 37/106 122/6 A |
| 5,239,945 A | * | 8/1993 | McCoy ................. | F22B 31/003 110/245 |

(Continued)

FOREIGN PATENT DOCUMENTS

| | | | |
|---|---|---|---|
| CN | 2926820 Y | * | 7/2007 |
| EP | 1 640 660 A2 | | 3/2006 |
| KR | 101342266 B1 | | 12/2013 |

OTHER PUBLICATIONS

CN2926820Y—machine translation.*

Primary Examiner — Nathaniel Herzfeld
(74) Attorney, Agent, or Firm — Venable LLP

(57) ABSTRACT

A watertube panel portion for a fluidized bed reactor and a corresponding method. The watertube panel portion includes multiple parallel metal tubes having a tube length L1, an outer surface, an original outer diameter OD1, and an original wall thickness WT1, and a circumferentially extending recess formed in a central portion of each of the tubes, between first and second end portions. The recess has a constant depth D that is less than the wall thickness WT1. The recess encircles the outer surface of the central portion of the metal tube. A circumferentially extending metal coating has a constant thickness of at most the depth D of the recess to blanket the recess of each of the multiple metal tubes. A fin is continuously welded between each pair of adjacent tubes.

21 Claims, 5 Drawing Sheets

(56) References Cited

U.S. PATENT DOCUMENTS

| | | | | |
|---|---|---|---|---|
| 5,893,340 A | * | 4/1999 | Belin | F22B 31/003 |
| | | | | 110/245 |
| 5,910,290 A | * | 6/1999 | Hyppanen | B04C 5/085 |
| | | | | 110/263 |
| 5,910,920 A | | 6/1999 | Keeth | |
| 6,242,112 B1 | * | 6/2001 | Forsberg | B32B 15/011 |
| | | | | 138/143 |
| 6,670,046 B1 | * | 12/2003 | Xia | C23C 4/00 |
| | | | | 416/229 A |
| 8,518,496 B2 | | 8/2013 | Seitz | |
| 2006/0065173 A1 | * | 3/2006 | Makela | F23C 10/18 |
| | | | | 110/343 |
| 2010/0300379 A1 | * | 12/2010 | Itai | F22B 37/04 |
| | | | | 122/235.12 |
| 2012/0214017 A1 | * | 8/2012 | Murphy | B23K 9/048 |
| | | | | 428/592 |

* cited by examiner

WATERTUBE PANEL PORTION AND A METHOD OF MANUFACTURING A WATERTUBE PANEL PORTION IN A FLUIDIZED BED REACTOR

BACKGROUND OF THE INVENTION

Field of the Invention

The present invention relates to a watertube panel portion and a method of manufacturing a watertube panel portion in a fluidized bed reactor. The invention relates especially to an arrangement for and a method of providing erosion protection in a watertube panel portion in a fluidized bed reactor. The invention is especially applicable in a vertical watertube panel portion adjacent to the upper edge of a refractory coated lower portion of a waterwall of a circulating fluidized bed (CFB) reactor.

Description of the Related Art

A conventional membrane surface, or a watertube panel, is made of parallel metal tubes connected together by metal strips, so-called fins, to construct a wall forming, for example, an enclosure of a fluidized bed reactor. High pressure water flows inside the tubes to extract heat from high temperature particles and gases in the reactor. Watertubes and membrane surfaces in different boilers, such as biomass-fired boilers, coal-fired boilers, and refuse-derived fuel (RDF) boilers are conventionally made of base materials, such as carbon steel, low alloy steels, or ferritic steels. These materials generally provide good strength and structural integrity, and excellent resistance to high temperature, high pressure water, and high pressure steam used in the heat transfer.

Due to vigorously moving bed particles, some areas, especially, the lower portions, of the waterwalls of a fluidized bed reactor have a risk of erosion. To minimize the erosion, the lower portions of the waterwalls, i.e., the watertube panels thereof, are conventionally protected by a layer of refractory. The upper edge of the refractory layer then usually forms a ledge that tends to be continuously hit by particles flowing downwards along the waterwall of the reactor, whereby particles bouncing from the ledge cause erosion of the vertical watertube panel above the refractory. To further minimize the erosion at this area, the upper edge of the refractory is often arranged in an outwards bent section of the waterwall so that the inner, or fireside, surface of the refractory is flush with or recessed from the vertical tubewall, or waterwall, thereabove, as originally suggested in the U.S. Pat. No. 5,091,156.

Even if the upper edge of the refractory layer is arranged in an outwards bent section of the waterwall, it has been noticed that in some cases there is a risk of erosion caused by turbulence eddies created at discontinuities in the vertical waterwall above the upper edge of the refractory layer. The erosion may especially take place when using a fluidized bed reactor, for example, a circulating fluidized bed (CFB) boiler, outside of the traditional parameters for fuel, such as with low ash, high volatility coal, or when switching from an original design fuel to another, more economical fuel.

European patent application publication No. EP 1 640 660 teaches to minimize erosion of a wall of a fluidized bed reactor above the refractory layer by coating the inner surface of the wall by a shield of, for example, sprayed metal, having at least two zones of different erosion resistance properties.

U.S. Pat. No. 8,518,496 discloses a method to slow the process of erosion and corrosion of vertical tubes in a tubewall at an interface with a refractory ledge in a fluidized bed boiler by providing an erosion and corrosion resistant coating on the fireside surface of the tubes, the coating having a smoothly and gradually upwards decreasing thickness, and a recess proximate to the refractory ledge.

Korean Patent publication No. KR 101342266 B1 suggests providing two different layers of coatings on top of the inner surface of the tubewall in the region of an outward bent portion of the tubewall above the upper edge of the refractory coated lower section of the waterwall of a circulating fluidized bed boiler.

A problem with the methods described in European patent application publication No. EP 1 640 660, U.S. Pat. No. 8,518,496, and Korean Patent publication No. KR 101342266 B1 is that the surface of the erosion resistance coating is at least, to some extent, at a higher level than the outer surface of the bare tubewall above the coated area, which causes turbulence eddies of the materials flowing in the reactor, and increased erosion of the tubewall above the coated area.

U.S. Pat. No. 5,910,920 discloses a fluidized bed reactor having a refractory lining on the inner side of the lower portion of a waterwall of the reactor and a recess formed on the inner surface of the waterwall above the refractory lining, the recess being defined by at least an upper endwall and a bottom, and a coating provided in the recess. The coating extends from the upper endwall of the recess to the refractory lining. Increased erosion of the bare tubewall above the coated area can be avoided if the surface of the coating is flush with the tubewall above the coating. A problem of the method described in U.S. Pat. No. 5,910,920, however, is that it is difficult to make the recess on the inner surface of the waterwall and a coating with a precisely formed surface in the recess.

An object of the present invention is to provide an economical and efficient watertube panel portion and a method of manufacturing a watertube panel portion in a fluidized bed reactor that minimizes problems caused by erosion in the watertube panel portion in a fluidized bed reactor, especially, in a vertical watertube panel portion adjacent to the upper edge of refractory coated lower portion of a waterwall of a circulating fluidized bed reactor.

SUMMARY OF THE INVENTION

According to one aspect, the present invention provides a method of manufacturing a watertube panel portion for a fluidized bed reactor, the method comprising the steps of (a) providing multiple metal tubes comprising a first end portion, a second end portion, and a central portion between the first end portion and the second end portion, wherein each of the first end portion and the second end portion has an outer surface and a substantially constant outer diameter OD1, and the central portion has an outer surface and a substantially constant outer diameter OD2, that is less than the outer diameter OD1, (b) providing a circumferentially extending metal coating having a substantially constant thickness of at most D, wherein D is (OD1−OD2)/2, on the outer surface of the central portion to blanket the outer surface of the central portion, (c) arranging the multiple metal tubes in a plane in parallel to each other, and (d) forming the watertube panel portion by continuously welding a fin between each pair of adjacent in parallel arranged metal tubes.

According to another aspect, the present invention provides a watertube panel portion for a fluidized bed reactor, the watertube panel portion comprising multiple metal tubes comprising a first end portion, a second end portion, and a central portion between the first end portion and the second end portion, wherein each of the first end portion and the second end portion has an outer surface and a substantially constant outer diameter OD1, a circumferentially extending recess formed in the central portion of the multiple metal tubes to encircle the outer surface of the central portion, whereby the central portion has an outer surface and a substantially constant outer diameter OD2, that is less than the outer diameter OD1, a circumferentially extending metal coating having a constant thickness of at most D, wherein D is (OD1−OD2)/2, to blanket the recess of each of the multiple metal tubes, wherein the multiple metal tubes are arranged in a plane in parallel to each other, and a fin continuously welded between each pair of adjacent, in parallel arranged, metal tubes, so as form the watertube panel portion.

The invention is based on the surprising observation of the present inventor that even if the erosion protection is desired only on one side of the watertube panel, an excellent erosion protection can efficiently and economically be provided in the watertube panel portion by providing a rotation symmetrical erosion preventing treatment for the metal tubes forming the watertube panel. Thus, a watertube panel portion having excellent erosion protection can advantageously be made of metal tubes prepared by first arranging, in each of the tubes, a circumferentially extending recess of suitable length and depth that encircles the outer surface of a central portion of the metal tube, and then providing a circumferentially extending metal coating to blanket the recess. The depth of the recess is naturally such that any required wall thickness remains in all portions of the water tube.

Such a circumferentially extending recess can be manufactured efficiently by conventional methods, for example, by a lathe, with a high precision, and a circumferentially extending metal coating that has a constant and an accurately defined thickness can be efficiently provided in such a recess. Then, the multiple metal tubes are arranged in a plane in parallel to each other, and the watertube panel portion is formed by continuously welding a fin between each pair of adjacent, in parallel arranged metal tubes.

A metal tube with a recess in a central portion of the tube can alternatively be provided by connecting two ends of a first tube portion, having the outer diameter OD2, to coaxially abut an end of a second tube portion and an end of a third tube portion, respectively, which second and third tube portions have the outer diameter OD1. Thereby, the first tube portion forms the central portion of the metal tube and the second and third tube portions form the first and second end portions of the metal tube, respectively.

According to an exemplary embodiment of the present invention, the metal tubes, of a length of about three meters, have, originally, an outer diameter OD1 of 63.5 millimeters and a wall thickness WT1 of about nine millimeters. At a central portion of the tubes is then made a recess having, for example, a length of 2.5 meters and a depth of two millimeters. Thereby, the recessed portion of each of the tubes has a decreased outer diameter OD2 of 59.5 millimeters and a decreased, or remaining, wall thickness WT2 of seven millimeters. At both ends of each of the tubes, there is a non-recessed end portion, still having the original diameter and wall thickness, the lengths of the end portions being, for example, forty centimeters and ten centimeters.

The recess is advantageously filled with a two millimeters thick spiral weld overlay coating of suitable metal material, preferably, a suitable alloy. The coating can be made to have the desired thickness, and an especially smooth surface by using, for example, a method described in U.S. Patent Application Publication No. 2012/0214017. Thereby, the spiral weld overlay, or three hundred sixty degrees weld overlay, is made by building a series of continuous spiral weld bead portions on the outer surface of a tube.

The weld overlay is advantageously of a high hardness, metallurgically bonded material that efficiently slows the erosion, and is simultaneously also alloyed so as to provide sufficient corrosion protection. As an example, the weld overlay cladding can be made of alloy materials having at least 20% Cr and a low iron (Fe) content. Depending on the conditions in the fluidized bed reactor, a wide variety of other corrosion and erosion/corrosion resistant alloys, including different stainless steels and nickel-based alloys, can also be used.

Described above is how the metal coating in the recess is provided as a weld overlay. Even if the use of weld overlays is a preferred method, the present invention is not limited to the use of weld overlays, but any other method providing a suitable metal coating, such as arc based thermal spraying, can alternatively be used.

After the above-described treatments, the metal tubes are arranged in parallel to each other in a plane, and a watertube panel portion is formed by continuously welding a fin between each pair of adjacent in parallel arranged metal tubes. If the watertube panel is to be used in especially demanding conditions, central portions of the fins may be coated by a conventional one-sided metal coating, which is advantageously arranged in a recess formed in the fins, as suggested in U.S. Pat. No. 5,910,920. The metal coating in the recesses formed in the fins can advantageously be made by metal spraying or as a so-called one hundred eighty degrees weld overlay, i.e., of multiple straight weld beads parallel to the axes of the water tubes.

Naturally, the dimensions of the tubes and the recesses therein, as well as the coating material, can vary depending on the needs of the application. An essential feature of the invention is that the recess of each of the tubes has a constant depth, and the respective metal coating has a constant thickness of at most the depth D of the recess so as to blanket the recess. Preferably, the metal coating is performed so that the coating is at least at one end of the recess smoothly flush with the outer surface of the adjacent end portion of the respective metal tube. By this arrangement, it is possible to minimize turbulence eddies and erosion at the interface between the coated metal tube and the bare metal tube at the respective end portion of the metal tube.

The prior art disclosed in U.S. Pat. No. 5,910,920 has similar goals to that of the present invention, but it fails to teach or to give a hint towards forming a circumferentially extending recess in the metal tubes, and providing a circumferentially extending metal coating in the recess. The present invention provides a much more efficient way of making the erosion protection than what is shown in the prior art. Moreover, the present invention renders it possible to make a much more precise recess, and to obtain a smoother and more accurate coating to avoid erosion causing turbulence eddies at the interface between the coating and the adjacent bare metal tube.

A watertube panel portion according to the present invention can advantageously be installed in any erosion prone location in a fluidized bed reactor, such as near the outlet of a solids separator. Thereby, a watertube panel portion of suitable dimensions can be welded in connection with other panel portions of a fluidized bed reactor to form the watercooled enclosure of a new fluidized bed reactor, or as a replacement part when servicing an existing fluidized bed reactor.

A watertube panel portion described above is especially suitable to be installed at the lower portion of the waterwalls of a fluidized bed reactor, adjacent to the upper edge of the refractory coated lower portion of the waterwalls. If the upper edge of the refractory coating is arranged in an outwards bent portion of the waterwall, for example, as shown in U.S. Pat. No. 5,091,156, the watertube panel portion needs to be bent to a suitable form before it is installed into the reactor. The bending of the watertube panel is advantageously made by forming a first bending at a first angle in a central region of the water tube panel portion by bending each of the multiple metal tubes, and the fins between the metal tubes, from the direction of the first end portions of the metal tubes around an axis perpendicular to both the first end portions of the metal tubes and the normal of the plane to a bent direction, and a second bending at a second angle from the bent direction to a second direction, wherein the second angle is opposite to the first angle, and is as large as or larger than the first angle. The first and second bendings are advantageously made so that the metal coatings formed in the tubes extend over both of the bendings.

Preferably, the bendings of the watertube panel are made at a longer distance from one end of the metal coatings, say, the first end of the metal coatings, than from the other end, say, the second end, of the metal coatings. In other words, the metal coatings of the metal tubes extend a longer distance from the first bending towards the first end portions of the metal tubes than from the second bending towards the second end portions of the metal tubes. Preferably, the metal coatings of the metal tubes extend a distance of at least one meter, even more preferably, a distance of at least two meters, from the first bending towards the first end portions of the metal tubes.

In order to maintain the properties of the metal coatings after performing the bending of the watertube panel portion, the metal coatings may, if desired, be heat-treated by a suitable process before the watertube panel portion is formed, or before or after the bending of the panel portion to the desired shape.

A bent watertube panel portion as described above is installed at the lower portion of a waterwall of a fluidized bed reactor in a vertical position, so as to have the first end portions of the metal tubes directed upwards. Then, a refractory coating is applied to the lower portion of the waterwall so as to extend to a level at or below the first, i.e., higher bending of the panel. Because the recess and the metal coating advantageously extend from below the second bending to a distance of at least one meter from the first bending towards the first end portions of the metal tubes, the metal tubes are protected from erosion in a region extending at least one meter upwards from the upper edge of the refractory coating.

The depth of the recess and the thickness of the metal coating are advantageously determined so that a desired strength and reliability of the coating is obtained, while also the desired strength of the waterwall is maintained. Because the thermal conductivity of a weld overlay of an alloyed metal is typically lower than that of the base metal, the thickness of the metal coating is also determined so that the desired heat transfer from the fluidized bed to the water in the water tubes is achieved.

The above brief description, as well as further objects, features, and advantages of the present invention will be more fully appreciated by reference to the following detailed description of the currently preferred, but nonetheless illustrative, embodiments of the present invention, taken in conjunction with the accompanying drawings.

DETAILED DESCRIPTION OF THE INVENTION

Figure 1:
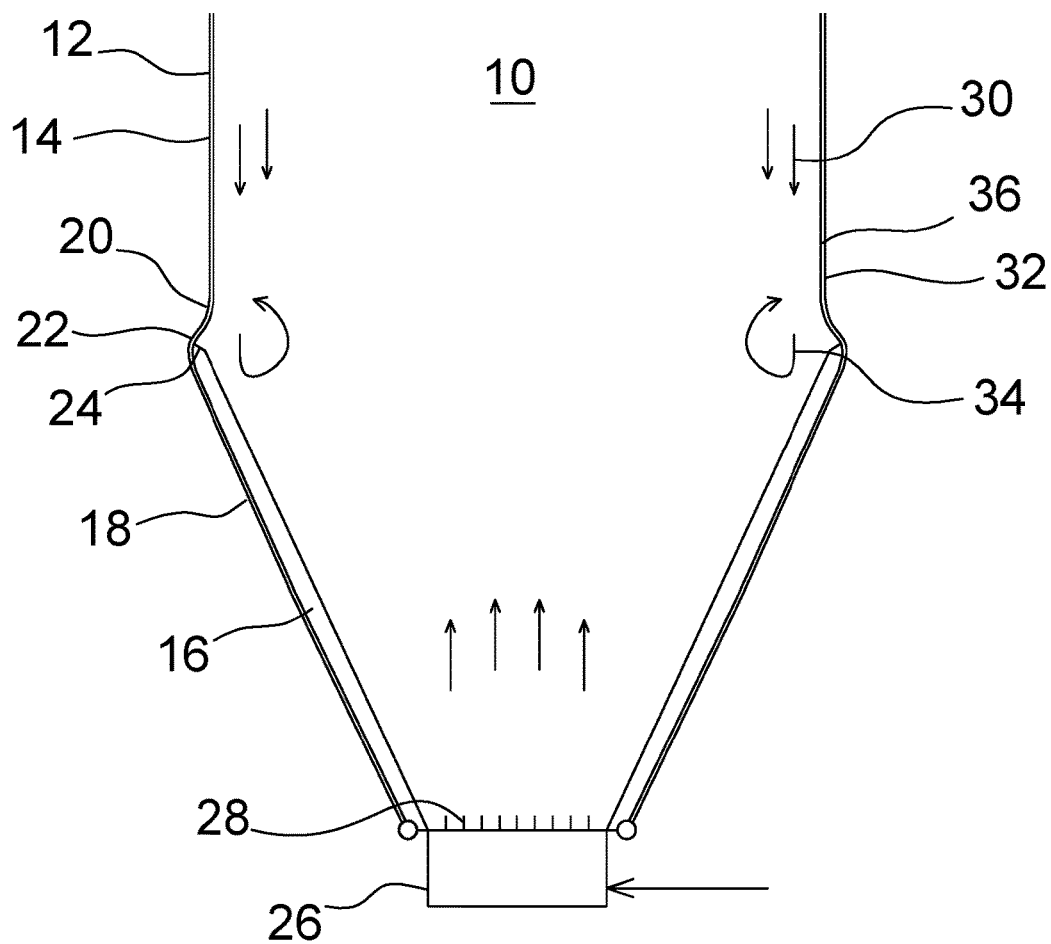
FIG. 1 schematically shows a bottom portion of a circulating fluidized bed boiler.

FIG. 1 schematically shows a bottom portion of a fluidized bed reactor 10 of a circulating fluidized bed boiler, the reactor 10 comprising waterwalls 12 formed of watertube panels 14 and a refractory coating 16 on the inwards tilted lower portions 18 of the waterwalls 12. The watertube panels 14 comprise a first bending 20 outwards and a second bending 22 inwards, the angle of the second bending 22 being greater than that of the first bending 20. The upper edge 24 of the refractory coating 16 is arranged in the area of the bendings 20, 22 so that the upper edge 24 is recessed from the fireside surface of the vertical watertube panel 14 above the refractory coated lower portion of the waterwall 12.

The fluidized bed reactor 10 comprises a conventional wind box 26 and fluidizing nozzles 28 for introducing fluidizing gas, usually air, for fluidizing fuel and other bed particles in the reactor 10. Fluidizing gas and bed particles flow mainly upwards in the reactor 10, but especially near the waterwalls 12 there is also a downwards directed flow of bed particles 30. The arrangement of having the upper edge of the refractory coating 16 in the area of the bendings 20, 22 minimizes erosion of the watertube panels 14 in the region 32 above the upper edge 24 of the refractory coating 16. When using especially eroding fuels or other bed materials, however, there is still a risk of erosion of the watertube panels 14 in this region due to turbulence eddies 34 of the downwards flowing bed particles caused by the discontinuity of the waterwall 12. Therefore, the present invention discloses an especially efficient method of making a metal coating 36 on the water tubes of the watertube panel 14.

Figure 2:
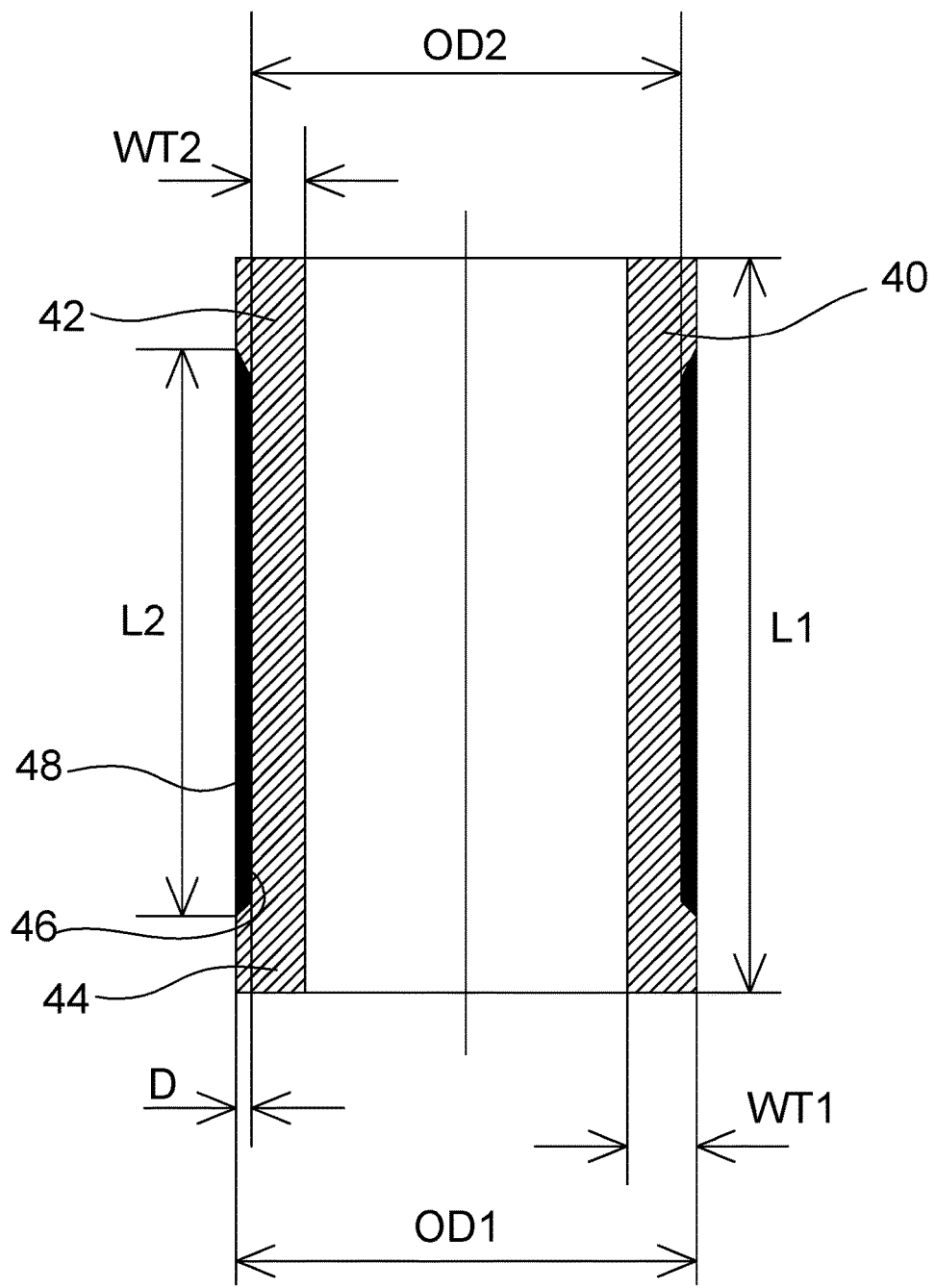
FIG. 2 schematically shows a metal tube with a metal coating according to an embodiment of the present invention.

FIG. 2 schematically shows a metal tube 40 of a length L1, having in its central portion, between a first end portion 42 and a second end portion 44 of the metal tube 40, a circumferentially extending recess 46 of depth D and length L2 formed on the outer surface of the metal tube 40. The metal tube 40 has originally an outer diameter OD1 and a wall thickness WT1. When the recess 46 is formed, the outer diameter OD1 is decreased in the central portion of the tube 40 to a value OD2, and the wall thickness to a value WT2. The ratio of the dimensions of the tube 40 shown in FIG. 2 differ clearly from what they usually are in practice. In reality, the tube 40 is usually much longer, and the wall thickness of the tube 40 and the depth of the recess 46 are much smaller than those shown in FIG. 2, when compared to the outer diameter OD1 of the tube 40.

In accordance with the present invention, a circumferentially extending metal coating 48 is provided in the recess 46. The recess 46 has a relatively smooth outer surface and a constant thickness, the thickness of the metal coating 48 being the same as the depth D of the circumferentially extending recess 46. The length of the metal coating 48 is correspondingly the same as the length L2 of the circumferentially extending recess 46. Thereby, the metal coating 48 blankets or fills the recess 46, and the thus formed outer diameter of the metal coated tube portion is the same as the original outer diameter OD1 of the metal tube 40.

Because the purpose of the metal coating 48 is to protect the metal tube 40 from erosion without causing any harmful turbulence eddies when installed into a fluidized bed reactor 10, the surface of the metal coating 48 is preferably at least at one end of the recess 46 smoothly flush with the outer surface of the adjacent end portion of the metal tube 40. To remove all surface texture, the surface may advantageously be lightly ground or polished flush with the tube surface above. In order to achieve the desired smoothness, the metal coating 48 is advantageously provided by a suitable spiral weld overlay method.

Figure 3:
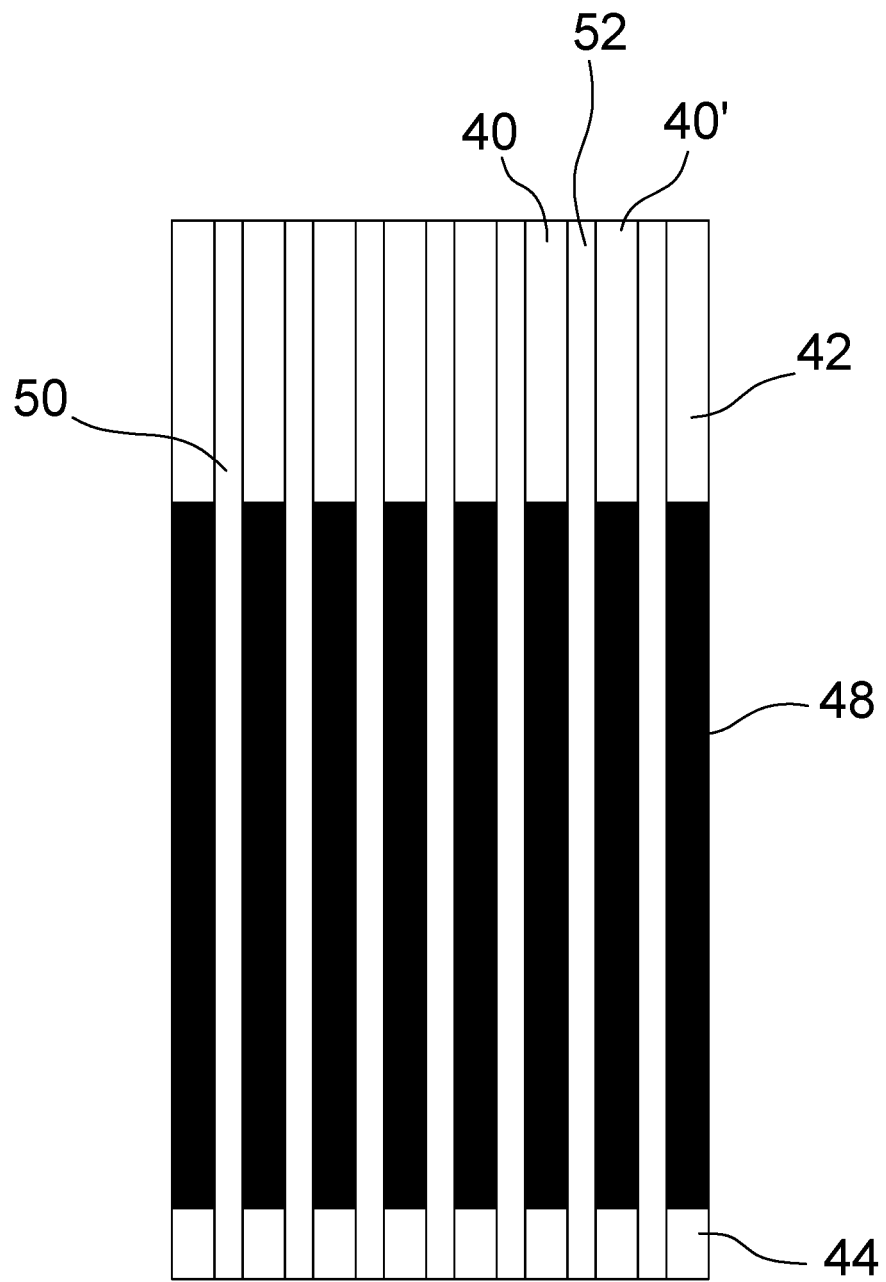
FIG. 3 schematically shows a plan view of a watertube panel portion according to an embodiment of the present invention.

FIG. 3 is a schematic plan view of a planar watertube panel portion 50 formed of multiple metal tubes 40, 40' of the type shown in FIG. 2. Between each pair of adjacent metal tubes 40, 40' is welded a conventional fin 52 to form the water tube panel portion 50. The reference numbers used for the features in FIG. 2 are also used for the same or corresponding features in FIGS. 3-5.

Between the first end portion 42 and second end portion 44 of each of the metal tubes 40, 40' is arranged a circumferentially extending metal coating 48. As described above, the metal coatings 48 are made in circumferentially extending recesses (not shown in FIG. 3), so as to fill or blanket the recesses. If desired, a one-sided metal coating 48 can also be provided in the central portion of the fins 52.

If the watertube panel portion of FIG. 3 is to be installed in a waterwall 12 of a fluidized bed reactor 10 to minimize erosion in the area above the upper edge 24 of a refractory coated lower section of the waterwall 12, wherein the upper edge 24 of the refractory coating 16 is to be arranged in an outwardly bent portion of the waterwall 12, suitable bendings have to be formed in the watertube panel portion 50.

Figure 4:
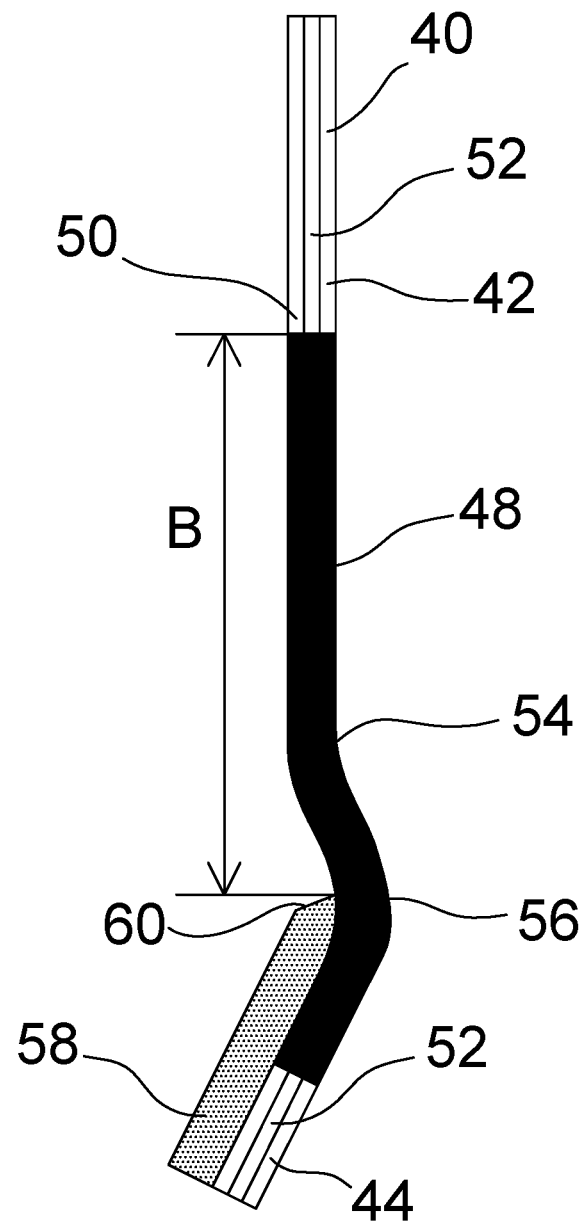
FIG. 4 schematically shows a side view of an exemplary watertube panel portion, with a refractory coating, corresponding to the plan view shown in FIG. 3.

FIG. 4 schematically shows a side view of an exemplary watertube panel portion 50 corresponding to the plan view shown in FIG. 3. In a central portion of a metal tube 40 is seen a metal coating 48 that is provided circumferentially around the tube 40. The metal coating 48 is advantageously made as a spiral weld overlay. The surface of the metal coating 48 is flush with the outer surface of the upper and lower end portions 42, 44 of the metal tube 40. On the side of the first and second end portions 42, 44 of the tube 40 is schematically shown a fin 52, which is welded between a pair of adjacent tubes 40, 40'.

In the lower section of the metal coated tube portion 48, there is a first bending 54 towards the side of the watertube panel portion 50, which will be an outer side of the panel portion when it is installed into a fluidized bed reactor 10. Further from the first bending 54, there is a second bending 56, which will be a lower bending when the panel portion 50 is installed into a fluidized bed reactor 10. As is seen in FIG. 4, the second bending 56 makes a larger angle than does the first bending 54, so as to form an inwards tapering waterwall 12 to the reactor 10.

Adjacent to the second end portion 44, which will be the lower end portion when the panel portion 50 is installed into a fluidized bed reactor 10, is seen a refractory coating 58. As is well-known to persons skilled in the art, the refractory coating 58 is conventionally applied to the fireside surface of the panel portion 50 only when the panel portion 50 is installed into a fluidized bed reactor 10. The refractory coating 58 conventionally has an upper edge 60 in the region of the second bending 56.

The discontinuity of the direction of the waterwall 12 tends to give rise to turbulence eddies above the upper edge 60 of the refractory coating 58, but the metal coating 48 of the metal tubes 40 provides efficient erosion protection to the tubes 40 in the region B shown in FIG. 4. The metal coating 48 advantageously extends clearly upwards, when installed into a fluidized bed reactor 10, from the first bending, preferably, by a distance of at least one meter, even more preferably, by a distance of at least two meters. The metal coating 48 also advantageously extends correspondingly to some distance downwards from the second bending 56, at least to a region that will be covered by the refractory coating 58.

In accordance with the present invention, the refractory coating 58 is formed circumferentially around the tubes 40, even if erosion protection is actually needed only on the fireside of the watertube panel portion 50. In many cases, it is enough to have erosion protection on the metal tubes 40 only. If needed, erosion protection can also be provided to the fins 52 welded between adjacent metal tubes 40. Erosion protection of the fins 52 is then advantageously made by providing a conventional one-sided metal coating to a one-sided recess formed to a desired portion of the fins 52. Erosion protection of the fins 52 is not shown in FIG. 4.

Figure 5:
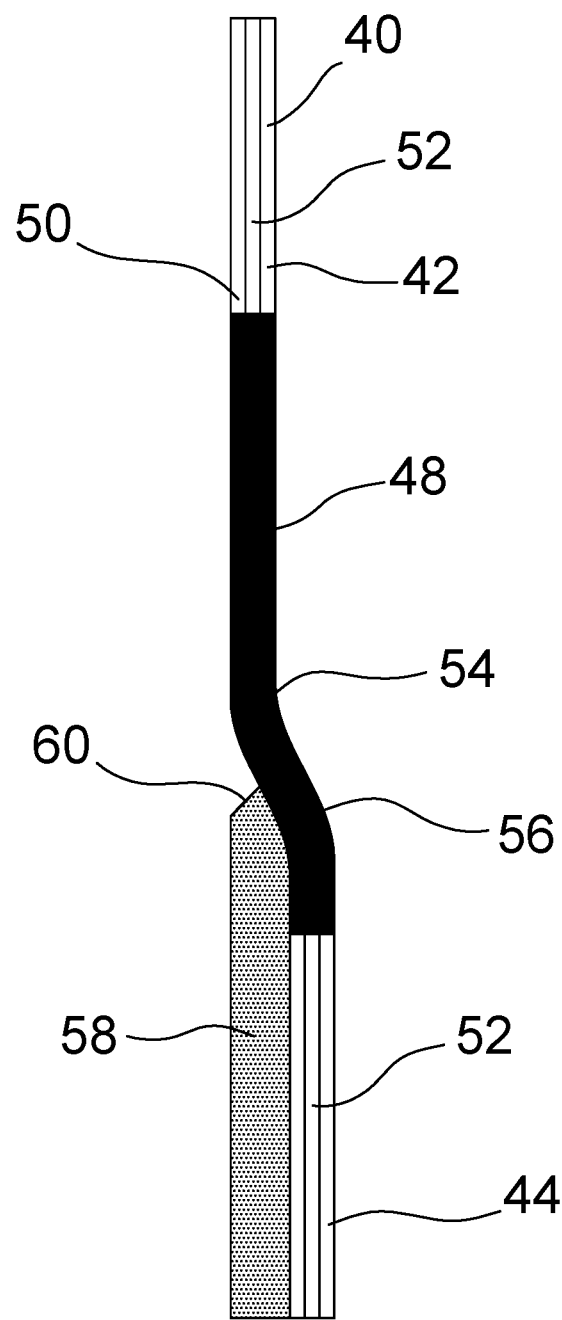
FIG. 5 schematically shows a side view of another exemplary watertube panel portion, with a refractory coating, corresponding to the plan view shown in FIG. 3.

FIG. 5 schematically shows a side view of another exemplary watertube panel portion 50 corresponding to the plan view shown in FIG. 3. The watertube panel portion 50 of FIG. 5 differs from that shown in FIG. 4 only in that the angle formed by the second bending 56 is as large as the angle formed by the first bending 54. Thereby, the second end portion 44 is parallel with the first end portion 42, but to some extent shifted outwards from the fluidized bed reactor 10, when the panel portion is installed into the fluidized bed reactor 10. In some cases, there is a third bending (not shown in FIG. 5), at a level that will be below the second bending 56, to form an inwards tapering waterwall 12 to the lower section of the reactor 10.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

I claim:

1. A method of manufacturing a watertube panel portion for a wall forming an enclosure of a fluidized bed reactor, the method comprising the steps of:
   (a) providing multiple metal tubes, each comprising a first end portion, a second end portion, and a central portion between the first end portion and the second end portion, wherein each of the first end portion and the second end portion has an outer surface and a substantially constant outer diameter OD1, and the central portion has an outer surface with a circumferentially extending recess encircling the outer surface, whereby the central portion has a rotation symmetrical outer surface with a substantially constant outer diameter OD2, that is less than the outer diameter OD1;

(b) providing a circumferentially extending metal coating having a substantially constant thickness of at most a depth D of the circumferentially extending recess, wherein D is (OD1−OD2)/2, on the outer surface of the central portion to blanket the circumferentially extending recess;

(c) arranging the multiple metal tubes in a plane in parallel to each other; and (d) forming the watertube panel portion by continuously welding a fin between each pair of adjacent, in parallel arranged, metal tubes.

2. The method according to claim 1, wherein each of the multiple metal tubes is formed by connecting two ends of a first tube portion having the outer diameter OD2 to coaxially abut an end of a second tube portion and an end of a third tube portion, respectively, which second tube portion and third tube portion each has the outer diameter OD1, whereby the first tube portion forms the central portion of the metal tube and the second tube portion and the third tube portion form the first end portion and the second end portion of the metal tube, respectively.

3. The method according to claim 1, wherein the circumferentially extending metal coating is provided as a spiral weld overlay.

4. The method according to claim 1, wherein the step of providing a circumferentially extending metal coating is performed so that at least one end of the coating is smoothly flush with the outer surface of the adjacent end portion of the respective metal tube.

5. The method according to claim 1, comprising further steps of forming a first bending at a first angle in a central region of the water tube panel portion by bending each of the multiple metal tubes and the fins between the metal tubes from the direction of the first end portions of the metal tubes around an axis perpendicular to both of the first end portions of the metal tubes and the normal of the plane to a bent direction, and a second bending at a second angle from the bent direction to a second direction.

6. The method according to claim 5, wherein the second angle is opposite to the first angle.

7. The method according to claim 6, wherein the second angle is equal to the first angle.

8. The method according to claim 6, wherein the second angle is greater than the first angle.

9. The method according to claim 5, wherein the metal coating of each of the metal tubes extends over the first and second bendings.

10. The method according to claim 9, wherein the metal coating of each of the metal tubes extends a longer distance from the first bending towards the first end portion of the metal tube than from the second bending towards the second end portion of the metal tube.

11. The method according to claim 5, wherein the metal coating of each of the metal tubes extends a distance of at least one meter from the first bending towards the first end portion of the metal tube.

12. A watertube panel portion for a fluidized bed reactor, the watertube panel portion comprising:

multiple metal tubes, each comprising a first end portion, a second end portion, and a central portion between the first end portion and the second end portion, wherein each of the first end portion and the second end portion has an outer surface and a substantially constant outer diameter OD1;

a circumferentially extending recess formed in the central portion of the multiple metal tubes to encircle the outer surface of the central portion, whereby the central portion has a rotation symmetrical outer surface with a substantially constant outer diameter OD2, that is less than the outer diameter OD1;

a circumferentially extending metal coating having a constant thickness of at most a depth D of the circumferentially extending recess, wherein D is (OD1−OD2)/2, to blanket the circumferentially extending recess of each of the multiple metal tubes, the multiple metal tubes being arranged in a plane in parallel to each other; and a fin continuously welded between each pair of adjacent, in parallel arranged, metal tubes, so as form the watertube panel portion.

13. The watertube panel portion according to claim 12, wherein the circumferentially extending metal coating is provided as a spiral weld overlay.

14. The watertube panel portion according to claim 12, wherein the circumferentially extending metal coating is at least at one end of the recess smoothly flush with the outer surface of an adjacent end portion of a respective metal tube.

15. The watertube panel portion according to claim 12, wherein the watertube panel portion comprises a first bending at a first angle in a central region of the water tube panel portion, wherein each of the multiple water tubes and the fins between the metal tubes are bent from the direction of the first end portions of the metal tubes around an axis perpendicular to both the first end portions of the metal tubes and the normal of the plane to a bent direction, and a second bending at a second angle from the bent direction to a second direction.

16. The watertube panel portion according to claim 15, wherein the second angle is opposite to the first angle.

17. The watertube panel portion according to claim 16, wherein the second angle is equal to the first angle.

18. The watertube panel portion according to claim 16, wherein the second angle is greater than the first angle.

19. The watertube panel portion according to claim 15, wherein the metal coating of each of the metal tubes extends over the first and second bendings.

20. The watertube panel portion according to claim 19, wherein the metal coating of each of the metal tubes extends a longer distance from the first bending towards the first end portion of the metal tube than from the second bending towards the second end portion of the metal tube.

21. The watertube panel portion according to claim 15, wherein the metal coating of each of the metal tubes extends a distance of at least one meter from the first bending towards the first end portion of the metal tube.

* * * * *